3,151,023
PREPARATIONS FOR COMBATING PHYTOPATHO-
GENIC MICROORGANISMS
Henry Martin, Basel, Switzerland, assignor to Ciba
Limited, Basel, Switzerland, a company of
Switzerland
No Drawing. Filed Apr. 18, 1962, Ser. No. 188,521
Claims priority, application Switzerland Apr. 21, 1961
7 Claims. (Cl. 167—30)

The present invention provides preparations for combating phytopathogenic microorganisms, which comprise as active substance a compound of the general formula (I) 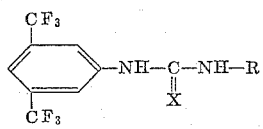

in which X represents an oxygen or sulfur atom, and R represents a phenyl radical which may be substituted by at least one halogen atom or lower alkyl or alkoxy group or at least one of the groups —CF$_3$, —OH, —NO$_2$, —CN, —SCN, —SO$_3$H, —SR′, —COR′, —COOA,

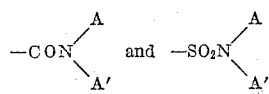

(in which R′ represents a lower alkyl group, and A and A′ each represent hydrogen or a lower alkyl group), in admixture with a carrier, a solvent, a diluent, a dispersing agent, a wetting agent, an adhesive agent, a fertilizer or another pest-combating agent.

As compounds of the above Formula I, there may be mentioned more especially those of the general formula (II) 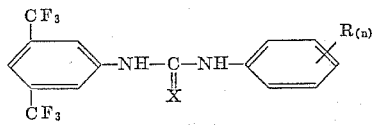

in which R represents a fluorine, chlorine or bromine atom or a lower alkyl or alkoxy group, or one of the groups —CF$_3$, —SO$_2$NH$_2$, —NO$_2$, —CN, —SCN, —COOR′, —SO$_2$R′, —COR′ or —SR′, in which R′ represents a lower alkyl group, $n$ is the whole number 1, 2 or 3, and X represents an oxygen or a sulfur atom.

The compounds of the general Formulae I and II have a pronounced action against fungi and bacteria that cause plant diseases. In particular, those compounds of the general Formulae I and II, in which X represents a sulfur atom, have an excellent action against phytopathogenic fungi.

Furthermore, the compounds of the above formulae exhibit an excellent action against certain phytopathogenic bacteria such, for example, as those of the genus Corynebacterium. A particularly strong antibacterial action is exhibited, for example, by the compound of the formula

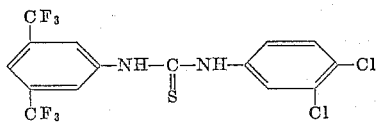

which, even when used at a concentration of 0.001 part per million, still exhibits an inhibitive action, as can be demonstrated, for example by a dilution test with a culture of Staphylococcus aureus in glucose broth.

It is especially important that the compounds of the invention do not lose their action against phytopathogenic microorganisms in the presence of surface-active substances.

As examples of the use of the compounds of the general Formula I for plant protection there may be mentioned the treatment of plant seeds and of plants in various stages of development, and also treatment of the soil in which the plants grow, to protect them from harmful microorganisms.

In this connection it is an important advantage that, when used at concentrations such as are required for the combating of parasites, the aforesaid compounds have no toxic side-effects on crop plants.

The invention also provides compounds of the general formula

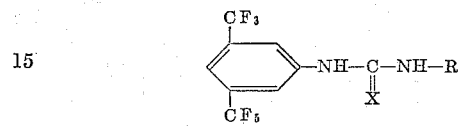

in which X represents a sulfur atom, and R represents a phenyl group which may be substituted by at least one halogen atom or a lower alkyl or alkoxy group or at least one of the groups —CF$_3$, —OH, —NO$_2$, —CN, —SCN, —SO$_3$H, —SR′, —COR′, —COOA,

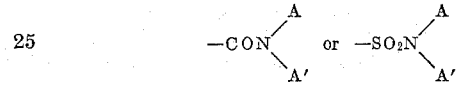

(in which R′ represents a lower alkyl group and A and A′ each represent a hydrogen atom or a lower alkyl group) and more especially compounds of the general formula

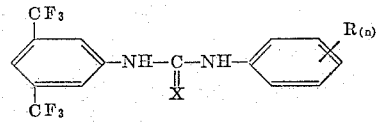

in which X represents a sulfur atom and R and $n$ have the meanings given in defining the general Formula II.

The compounds of the general Formula I can be made by methods in themselves known. For example, a compound of the general formula

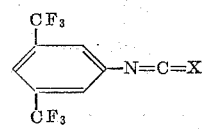

in which X represents an oxygen or sulfur atom, may be reacted with a compound of the general formula $$H_2N—R$$

in which R has the meaning given in defining the above general Formula I; or a compound of the general formula

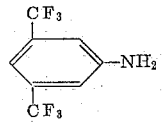

may be reacted with a compound of the general formula $$R—N=C=X$$

in which R and X have the meanings given above.

Thus, to make a compound of the general Formula I, for example, 3:5-bis-trifluoromethylphenyl isocyanate or isothiocyanate is reacted with one of the following compounds:

Aniline or a substituted aniline such, for example, as para-chloraniline, 3:4-dichloraniline, 3:5-dichloraniline, 2:5-dichloraniline, 3:4:5-trichloraniline, 2:4:5-trichloraniline, 3-chloro-4-bromaniline, 3-chloro-4-methoxyaniline, 3-chloro-4-methylaniline, 3-trifluoromethylaniline, 2-chloro-5-trifluoromethylaniline, 3-trifluoromethyl-4-chloraniline, 3:5-bis-trifluoromethylaniline, 4-bromaniline, 2:4-dichloraniline, 4-aminobenzenesulfonylamide, 4-aminobenzoic acid methyl ester, 4-butoxyaniline, 4-thiocyananiline, 4-aminoacetophenone, 4-aminophenylacetic acid methyl ester, 3-bromaniline, 4-chloro-3-methylaniline, 4-chloro-2-methylaniline, 3:5-dichloro-4-methylaniline or 4-chloro-3:5-dimethylaniline; hydroxyaminobenzenes such, for example, as 4-chloro-2-amino-1-hydroxybenzene, 5-chloro-2-amino-1-hydroxybenzene, 4:5-dichloro-2-amino-1-hydroxybenzene, 3:4:6-trichloro-2-amino-1-hydroxybenzene, 4- or 5-bromo-2-amino-1-hydroxybenzene, 4:6-dibromo- or 4:6-dichloro-2-amino-1-hydroxybenzene, 4:5-dibromo-2-amino-1-hydroxybenzene, or 4-chloro-3-trifluoromethyl-2-amino-1-hydroxybenzene.

Instead of the isocyanates there may be used with similar success the corresponding carbonic acid derivatives, such as 3:5-bis-trifluoromethylphenyl-carbonic acid phenyl ester, 3:5-bis-trifluoromethylphenyl-carbonic acid chloride or 3:5-bis-trifluoromethylphenyl-urea. By using 3:5-bis-trifluoromethylphenyl isothiocyanate, instead of 3:5-bis-trifluoromethylphenyl isocyanate, the corresponding thioureas are formed. On the other hand, by desulfurizing the thioureas in known manner, the correspondingly constituted ureas can be obtained. Alternatively, 3:5-bis-trifluoraniline may be reacted with a phenyl isocyanate or phenyl isothiocyanate, for example, one that contains one or more nitro groups, such as 4-nitrophenyl isocyanate, 3-nitro- or 2-nitro-phenyl isocyanate, 4-methyl-3-nitrophenyl isocyanate, 4-chloro-3-nitrophenyl isocyanate, 2-nitro-4-chlorophenyl isocyanate, 2-methyl-4-nitro-5-chlorophenyl isocyanate, 2-methoxy-4-nitro-5-chlorophenyl isocyanate or 2:4-dinitrophenyl isocyanate, or the corresponding isothiocyanates.

The compounds of the general Formula I can also be prepared by other methods, for example, by reacting a reactive derivative of carbonic or thiocarbonic acid, for example, carbon disulfide, urea, a phenyl carbonate or phosgene, with an appropriately substituted aromatic amine. For making a symmetrical compound there may also be used the reaction of 3:5-bis-trifluoromethyl-phenyl isocyanate with the requisite quantity of water, for example, in an inert solvent, such as acetonitrile.

The compounds of the general Formula I may be used alone or in conjunction with other pest-combating agents and/or the additives referred to above.

As pest-combating agents that may be present in the preparations of the invention in addition to compounds of the general Formula I there may be mentioned for example:

3:4-dichlorobenzyl alcohol, ammonium compounds such, for example, as diisobutylphenoxy-ethoxyethyl-dimethyl benzyl ammonium chloride, cetyl-pyridinium chloride, cetyl trimethyl-ammonium bromide, a halogenated dihydroxy-diphenyl methane, tetramethyl-thiuram disulfide, 2:2'-thio-bis-(4:6-dichlorophenol), 2-nitro-2-furfuryl iodide, salicylic acid anilides, dichlorosalicylic acid anilides, dibromosalicylic acid anilides, tribromosalicylic acid anilides, dichloro-cyanuric acid, tetrachlorosalicylic acid anilides, aliphatic thiuram sulfides or "hexachlorophene" (2:2'-dihydroxy-3:5:6-3':5':6'-hexachlorodiphenyl-methane).

The preparations of the invention may be made up in a very wide variety of forms, for example, as pastes, powders, emulsions, suspensions, solutions or sprays.

As carriers for making solutions that can be sprayed as such there may be used organic solvents boiling above 100° C., for example, mineral oil fractions boiling above 100° C., such as Diesel oil or kerosene, also coal tar oils and oils of vegetable or animal origin, and also hydrocarbons boiling above 100° C., such as alkylated naphthalenes or tetra-hydronaphthalene, if desired in admixture with xylene mixtures, cyclohexanols, ketones; furthermore chlorinated hydrocarbons such as tetrachlorethane, trichlorethylene, trichlorobenzenes or tetrachlorobenzenes.

Preparations in the form of emulsion concentrates, pastes or wettable powders can be diluted with water to yield aqueous spraying liquors. There may be used non-ionic emulsifiers or dispersing agents, for example, condensation products of ethylene oxide with aliphatic alcohols, amines or carboxylic acids containing a hydrocarbon radical having about 10 to 30 carbon atoms, such as a condensation product of octadecyl alcohol with 25 to 30 molecular proportions of ethylene oxide, or of commercial oleylamine with 15 molecular proportions of ethylene oxide, or of dodecyl-mercaptan with 12 molecular proportions of ethylene oxide. As anionic emulsifiers there may be mentioned the sodium salt of the sulfuric acid ester of dodecyl alcohol, the sodium salt of dodecyl-benzene sulfonic acid, the potassium or triethanolamine salt of oleic or abietic acid or of mixtures of these acids, or the sodium salt of a petroleum sulfonic acid. As cationic dispersing agents there may be mentioned quaternary ammonium compounds, such as cetyl-pyridinium bromide or di-hydroxyethyl-benzyl-dodecyl-ammonium chloride.

Preparations suitable for scattering or dusting may be used by using a solid carrier, such as talcum, kaolin, bentonite, calcium carbonate or calcium phosphate; or carbon, cork meal, wood meal or other materials of vegetable origin. It is also very advantageous to make up the preparations in a granulated form. The various types of preparations may contain the usual additives that improve the distribution, adhesion, resistance to rain or the penetrating power. As such substances there may be mentioned fatty acids, resins, glue, casein or, for example alginates.

The following examples illustrate the invention, the parts and percentages being by weight.

*Example 1*

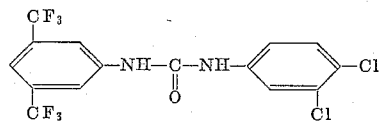

To a solution of 16.2 grams of 3:4-dichloraniline in 150 cc. of acetonitrile is added a solution of 25.5 grams of 3:5-bis-trifluoromethylphenyl isocyanate (boiling at 63° C. under 14 mm. Hg pressure) in 25 cc. of acetonitrile with vigorous stirring. After a short time the condensation product of the above formula precipitates. A further 25 cc. of acetonitrile are then added, and the whole is stirred for a few hours. The 3:5-bis-trifluoromethyl-3':4'-dichloro-carbanilide is filtered off with suction, washed with acetonitrile and dried in vacuo. The crude yield amounts to 36 grams. The product melts at 223–224° C. and, after recrystallization from acetonitrile, at 227° C.

*Example 2*

(1) 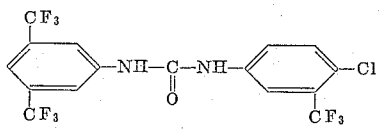

To a solution of 19.5 grams of 4-chloro-3-trifluoromethylaniline in 150 cc. of acetonitrile is added a solution of 25.5 grams of 3:5-bis-trifluoromethylphenyl isocyanate in 25 cc. of acetonitrile with vigorous stirring. Condensation takes place with the slight evolution of heat, but no precipitate is formed. By evaporation of the mixture in vacuo 3:3':5-tri-trifluoromethyl-4'-chloro-diphenyl-urea is obtained as an oil, which soon solidifies. The crude product melts at 178–182° C., and, after recrystallization from chlorobenzene, the pure product melts at 177–178° C. Alternatively, the condensation may be performed in chlorobenzene, in which case the product settles out immediately in crystalline form.

In an analogous manner the following products can be made:

(2) 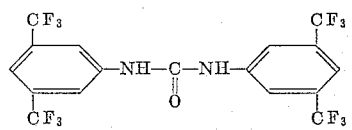

melting at 253–256° C. after recrystallization from nitromethane.

(3) 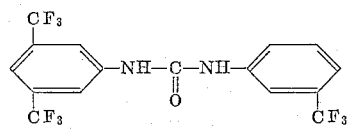

melting at 165–167° C. after recrystallization from chlorobenzene.

(4) 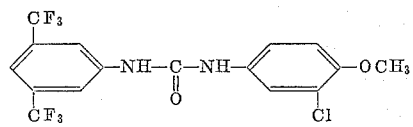

melting at 188–190° C. after recrystallization from acetonitrile.

(5) 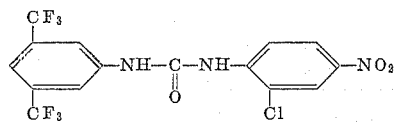

On crystallization from acetonitrile with the addition of animal charcoal the 3:5-bis-trifluoromethyl-2'-chloro-4'-nitrocarbanilide is obtained in the form of almost colorless, long needles, in radial arrangement; it melts at 211–212° C.

(6) 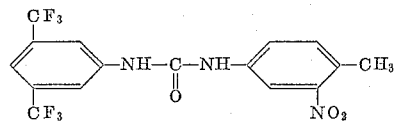

melting at 215–217° C. after recrystallization from nitromethane.

(7) 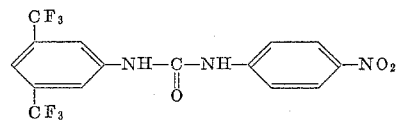

The 3:5-bis-trifluoromethyl-4'-nitro-carbanilide forms a yellow, finely crystalline powder which melts at 220 to 225° C. and a second time at 300 to 305° C.

(8) 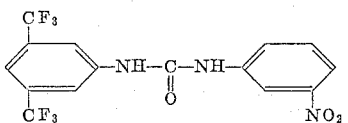

melting at 230–232° C.

(9) 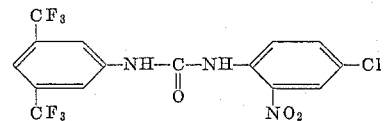

melting at 204–206° C.

(10) 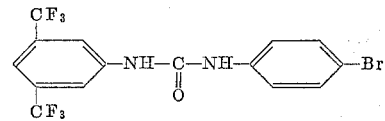

melting at 224–225.5° C. after recrystallization from acetonitrile.

(11) 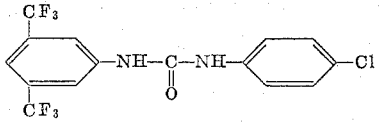

melting at 214.5–215.5° C. after recrystallization from acetonitrile.

(12) 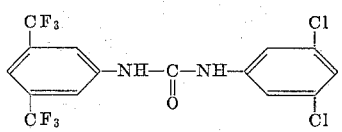

melting at 219–219.5° C. after recrystallization from acetonitrile.

(13) 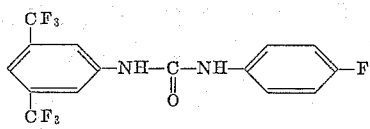

melting at 213–214° C. after recrystallization from acetonitrile.

(14) 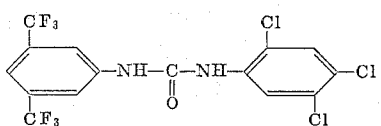

After recrystallization from acetonitrile, the 3:5-bis-trifluoromethyl-2':4':5'-trichlorocarbanilide melts at 227–228° C., then solidifies at 229° C. and sublimes at 270–275° C.

(15) 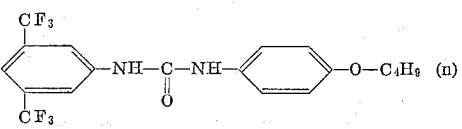

melting at 195–195.5° C. after recrystallization from acetonitrile.

(16) 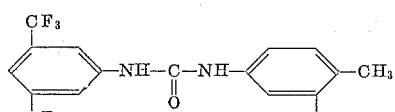

melting at 230–231° C. after recrystallization from acetonitrile.

(17) 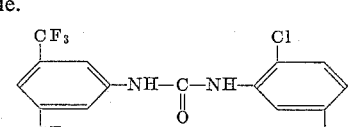

melting at 225–226° C. after recrystallization from acetonitrile.

(18) 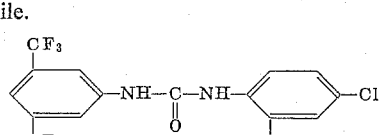

melting at 192–194° C. after recrystallization from acetonitrile.

(19) 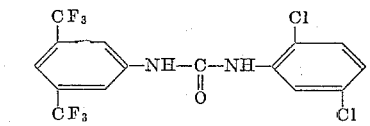

melting at 225.5–227° C. after recrystallization from acetonitrile.

(20) 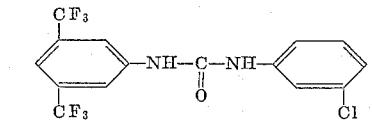

melting at 175–176° C. after recrystallization from acetonitrile.

(21) 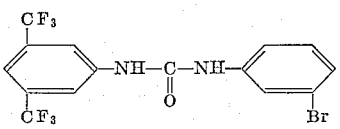

melting at 174–175° C. after recrystallization from nitromethane and washing with chloroform.

(22) 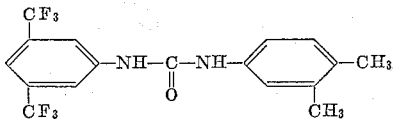

melting at 185.5–186.5° C. after recrystallization from acetonitrile.

(23) 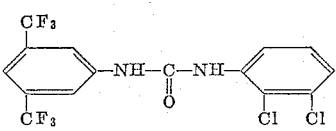

melting at 222.5–223.5° C. after recrystalliaztion from acetonitrile.

(24) 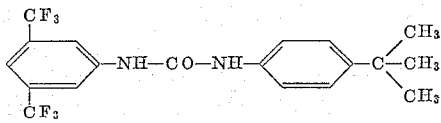

melting at 167–168° C.

(25) 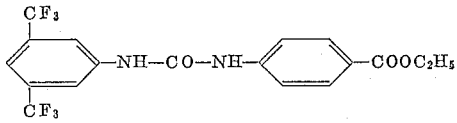

melting at 230–231° C. after recrystallization from acetonitrile.

(26) 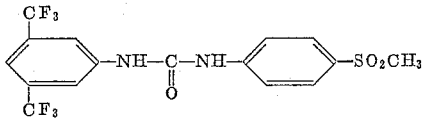

melting at 224–225.5° C. after recrystallization from acetonitrile.

(27) 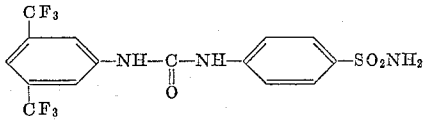

melting at 228–230° C. after recrystallization from acetonitrile.

(28) 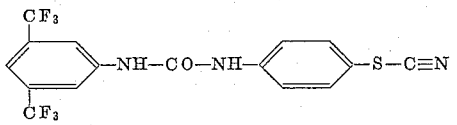

melting at 204–205° C. after recrystallization from acetonitrile.

(29) 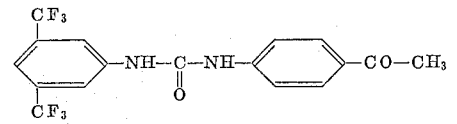

melting at 238–239° C. after recrystallization from butanol and washing with acetonitrile.

(30) 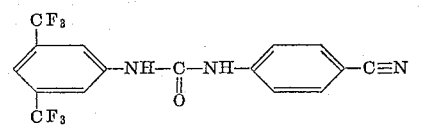

melting at 252–253° C. after recrystallization from acetonitrile.

(31) 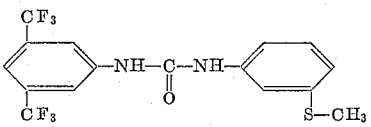

The 3:5-bis-trifluoromethyl-3'-thiomethyl-carbanilide precipitates slowly from the reaction mixture heated at 60° C. It melts at 158–159.5° C. after recrystallization from acetonitrile.

(32) 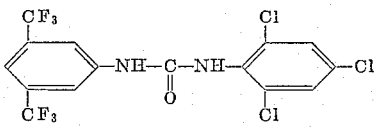

The compound melts at 225–227° C., then solidifies at 229° C. and finally sublimes at about 295° C.

(33) 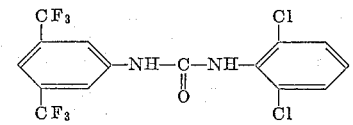

melting at 227° C. after recrystallization from acetonitrile.

(34) 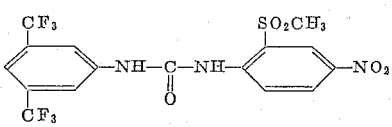

melting at 227–230° C.

(35) 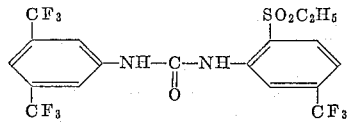

melting at 173–175° C.

(36) 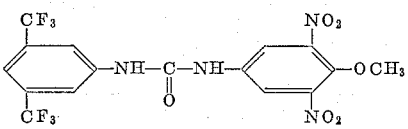

melting at 226–228° C.

*Example 3*

(1) 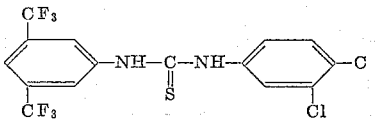

A solution of 16.2 grams of 3:4-dichloraniline in a small amount of acetonitrile is added to 27 grams of 3:5-bis-trifluoromethylphenyl isothiocyanate (boiling at 83° C. under 12 mm. Hg pressure). The reaction mixture heats up in a short time to 82° C.; it is heated for 1 hour on a boiling waterbath, and is then evaporated in vacuo to yield 3:5-bis-trifluoromethyl-3':4'-dichlorothiocarbanilide as a solid substance which is recrystallized from benzene. The purified product melts at 138–139° C.

(2) 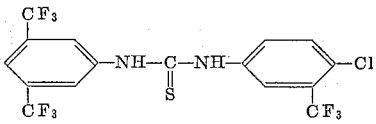

27.1 grams of 3:5-bis-trifluoromethylphenyl isothiocyanate are added to a solution of 19.5 grams of 3-amino-6-chlorobenzotrifluoride in 20 cc. of acetonitrile, and the whole is heated for 1 hour on a waterbath. The reaction mixture becomes slightly colored and thickly liquid. It is evaporated in vacuo, and then heated for 2 hours at 90° C. The crude solid product melts at 139–141° C. It is heated in a small amount of benzene in the presence of animal charcoal, and the filtered, warm solution is mixed with an equal volume of cyclohexane, whereupon 3:3′:5-tri-trifluoromethyl-4′-chlorothiocarbanilide crystallizes out. It melts at 138.5 to 139° C.

(3) 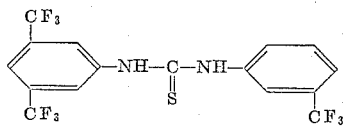

3:3′5-tri-trifluoromethyl-thiocarbanilide is prepared as described above under (2). The crude product is dissolved in hot benzene, mixed with animal charcoal and filtered, and the clear filtrate is mixed with an equal volume of cyclohexane, whereupon crystallization sets in. The product melts at 133–134° C.

(4) 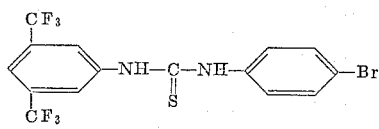

3:5-bis-trifluoromethyl-4′-bromo-thiocarbanilide is prepared in a corresponding manner. After recrystallization from a mixture of benzene and cyclohexane it melts at 163–164° C.

(5) 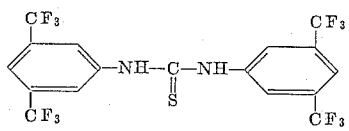

27.1 grams of 3:5-bis-trifluoromethylphenyl isothiocyanate are mixed with 22.9 grams of 3:5-bis-trifluoromethylaniline without the use of a solvent, and the mixture is heated on a boiling waterbath. The reaction mixture solidifies to a solid crystalline cake. After recrystallization from nitromethane and being washed with benzene, the resulting 3:3′:5:5′-tetratrifluoromethyl-thiocarbanilide melts at 184.5–186° C.

(6) 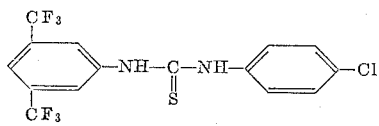

3:5-bis-trifluoromethyl-4′-chlorothiocarbanilide is prepared as described under (1) above. After recrystallization from a mixture of benzene and cyclohexane it melts at 150–151° C.

(7) 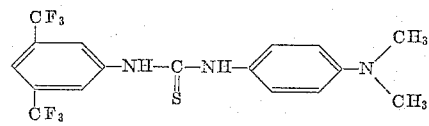

A mixture of 17.8 grams of para-N-dimethylamino-phenyl-isothiocyanate and 22.9 grams of 3:5-bis-trifluoromethylaniline is heated for several hours on a boiling waterbath. The initially liquid reaction mixture solidifies in a short time to a crystalline mass, which is then expressed on a suction filter, and 3:5-bis-trifluoromethyl-4′-N-dimethylamino-thiocarbanilide is recrystallized from benzene. It melts at 167.5–170° C.

(8) 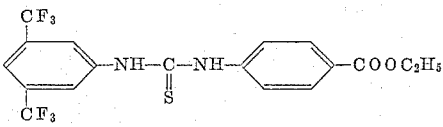

A solution of 16.5 grams of para-aminobenzoic acid ethyl ester in 15 cc. of acetonitrile is mixed with 27.1 grams of 3:5-bis-trifluoromethylphenyl isothiocyanate. After a shot time the temperature rises to 65° C. and soon after 3:5-bis-trifluoromethyl-4′-carboxyethyl thiocarbanilide precipitates. It is dried in vacuo and recrystallized from acetonitrile. It then melts at 147.5–148° C.

(9) 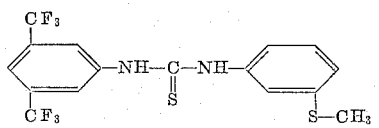

3:5-bis-trifluoromethyl-3′-thiomethyl thiocarbanilide is prepared from 3:5-bis-trifluoromethylphenyl isothiocyanate and freshly distilled 3-methylthioaniline. After recrystallization from a mixture of benzene and cyclohexane it melts at 125–127° C.

The following compound is prepared in an analogous manner:

(10) 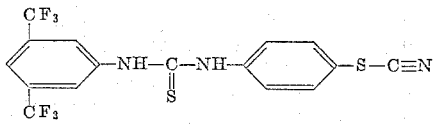

It melts at 122° C. after recrystallization from acetonitrile.

*Example 4*

(a) 10 grams of the active substance described under (1) in Example 3 and 2 grams of sulfite cellulose waste liquor are mixed with 100 cc. of water. The mixture is intensively ground to form a fine, stable dispersion, which can be diluted with water as desired.

(b) 7.5 parts of the emulsifier marketed under the trade name "Toximul MP" by Ninol Inc., Chicago, are dissolved in 72.5 parts of butanol, and 20 parts of the compound described under (1) in Example 3 are dissolved in the mixture. The solution can be diluted with water as desired.

(c) Tomato plants and celery plants were sprayed with solutions of 0.2% strength of each of the dispersions prepared as described under (a) and (b) above. 2 days after spraying, the tomato plants were infected with a spore suspension of *Alternaria solani* and of *Phytophthora infestans*, and the celery plants with a spore suspension of *Septoria apii*. The infected plants were kept for 2 days in an incubation chamber at a relative humidity of 95 to 100% and a temperature of 22–25° C. The effects produced on the celery plants were evaluated about 15 to 18 days, and those on the tomato plants 6 to 8 days, after the infection.

The fungicidal action of the preparations against *Septoria apii* on the celery was 100%, against *Alternaria solani* on the tomatoes 93%, and against *Phytophthora infestans* on the tomatoes 100%, with reference to the untreated control plants.

In the following table are given the results of further tests carried out under the conditions described under (c). Spray liquors were used that had been prepared as described under (b), except that they contained, instead of the active substance (1) of Example 3, the active substances given in the table.

| Active substance | Fungicidal action in percent | | |
|---|---|---|---|
| | Alternaria solani | Phythophthora infestans | Septoria apii |
| 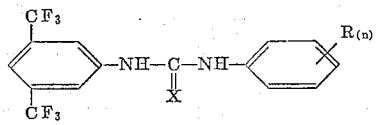 | 95 | 85 | 100 |
| 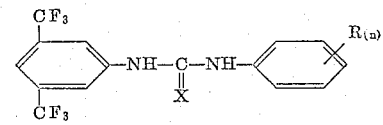 | 76 | 83 | 97 |
| 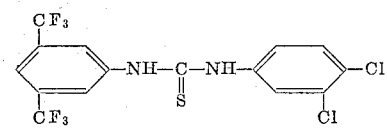 | 96 | 0 | 90 |

Similar results were obtained against the aforesaid fungi with the compounds (5), (7) and (9) described in Example 3.

The other compounds described in Example 3 also exhibited a pronounced action against the aforesaid fungi that cause plant diseases. The compounds (1), (3), (10), (11), (26), (27), (28), (31) and (34) described in Example 2 also have excellent actions against the aforesaid fungi under the test conditions described above.

What is claimed is:

1. A method for combating phytopathogenic microorganisms on plants which comprises applying to the plants which are subject to attack by said microorganisms a microbicidal amount of a compound of the formula

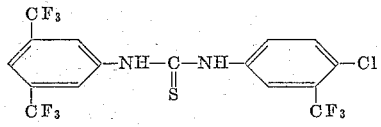

in which R represents a member selected from the group consisting of a fluorine, chlorine and bromine atom, a lower alkyl, alkoxy, —CF$_3$, —SO$_2$NH$_2$, —NO$_2$, —CN, —SCN, —NR'$_2$, —COOR', SO$_2$R', —COR' and —SR' group, wherein R' has the meaning of a lower alkyl group, $n$ is a whole number of at most 3, and X represents a member selected from the group consisting of an oxygen atom and a sulfur atom.

2. A method for combating phytopathogenic microorganisms on plants which comprises applying to the plants which are subject to attack by said microorganisms a microbicidal amount of a compound of the formula

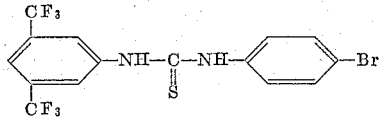

in which R and $n$ have the meanings given in claim 1 and X represents a sulfur atom.

3. A method for combating phytopathogenic microorganisms on plants which comprises applying to the plants which are subject to attack by said microorganisms a microbicidal amount of the compound of the formula

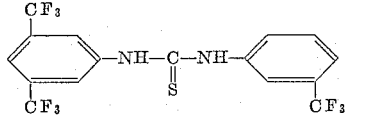

4. A method for combating phytopathogenic microorganisms on plants which comprises applying to the plants which are subject to attack by said microorganisms a microbicidal amount of the compound of the formula

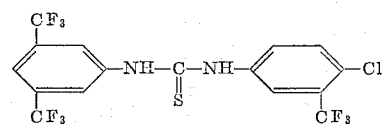

5. A method for combating phytopathogenic microorganisms on plants which comprises applying to the plants which are subject to attack by said microorganisms a microbicidal amount of the compound of the formula

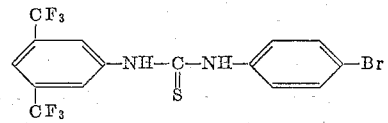

6. A method for combating phytopathogenic microorganisms on plants which comprises applying to the plants which are subject to attack by said microorganisms a microbicidal amount of the compound of the formula

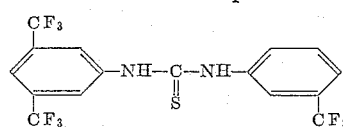

7. A method for combating phytopathoginec microorganisms on plants which comprises applying to the plants which are subject to attack by said microorganisms a microbicidal amount of the compound of the formula

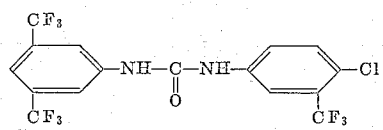

References Cited in the file of this patent
UNITED STATES PATENTS

| 2,703,332 | Bindler et al. | Mar. 1, 1955 |
| 2,745,874 | Schetty et al. | May 15, 1956 |
| 2,758,053 | Smith et al. | Aug. 7, 1956 |
| 2,771,489 | Andrieth et al. | Nov. 20, 1956 |
| 2,818,367 | Jarvorski et al. | Dec. 31, 1957 |
| 2,867,659 | Model et al. | Jan. 6, 1959 |